United States Patent Office

2,994,667
Patented Aug. 1, 1961

2,994,667
OLEFIN POLYMERIZATION CATALYST
Emory W. Pitzer, Bartlesville, Okla., assignor to Phillips Petroleum Company, a corporation of Delaware
No Drawing. Filed May 23, 1956, Ser. No. 586,634
7 Claims. (Cl. 252—455)

This invention relates to an improved chromium oxide olefin polymerization catalyst and process. A specific aspect of the invention pertains to an olefin polymerization process utilizing an improved chromium oxide-silica-alumina catalyst.

In a recently developed process disclosed in the application of J. P. Hogan and R. L. Banks S.N. 573,877, filed March 26, 1956, now Patent 2,825,721, certain olefins and diolefins are polymerized to solid polymers by contacting the olefin feed with a chromium oxide-silica-alumina catalyst at relatively low temperatures and pressures in liquid, vapor, or mixed phase, preferably, in liquid phase in the presence of a solvent-diluent for the olefin. Solid polymers are produced from 1-olefins of 2 to 8 carbon atoms per molecule in which there is no branching nearer the double bond than the 4 position. Diolefins such as styrene and butadiene are also polymerized to solid polymers. The catalyst is effective with other olefins but liquid polymers are produced. The reaction temperature includes a range of about 150 to 450° F., but temperatures outside of this range can also be used to effect the production of solid polymer. The pressure utilized is preferably high enough to maintain the diluent in liquid phase and to assure that olefin not liquefied under these conditions is dissolved in the liquid phase in sufficient amount to effect polymerization. Pressures as low as 100 p.s.i.g. and up to 700 p.s.i.g. or higher are effective, and a pressure of approximately 450 p.s.i.g. is preferred. When effecting the reaction in the vapor phase, the pressure may be as low as atmospheric. Variation in the reaction conditions within the ranges stated vary the character of the solid polymer produced. The polymerization reaction may be effected in a fixed bed, a moving bed, a fluidized bed, or in a bed of catalyst particles suspended in a liquid reaction mixture in a stirred reactor.

The catalyst described in the above-identified application may be made by various conventional methods, including coprecipitation of the silica and alumina, and thereafter impregnating the coprecipitated gel with a chromium compound readily converted to the oxide upon calcination. The impregnation of the base may be effected before or after pelleting the silica-alumina.

This invention is concerned with an improved chromium oxide polymerization catalyst for use in the Hogan and Banks process which effects higher yields of solid polymer than chromium oxide catalysts heretofore utilized.

Hence it is an object of the invention to provide an improved process for polymerizing olefins. Another object is to provide an improved olefin polymerization process which effects increased yield of polymer. A further object is to provide an improved method of preparing supported chromium oxide catalyst for use in olefin polymerization. Other objects of the invention will become apparent from the accompanying disclosure.

I have found that the rate of polymer production in the process disclosed in the above-identified Hogan and Banks application is increased by utilizing a catalyst base made in a particular manner in the preparation of the chromium oxide-silica-alumina catalyst of said application. The method of producing the silica-alumina base comprises mixing separately prepared silica hydrogel and alumina hydrate in the desired proportions, milling them together in the presence of free water to reduce the materials to a fine particle size, preferably an average particle size less than 25 microns and, more desirably, less than 5 microns, drying the comminuted material, and calcining the same at an elevated temperature in the range of 700 to 1500° F. It is preferable to form the comminuted silica and alumina into pills or pellets by extrusion or tabletting prior to incorporation of the chromium compound into the base or support; however, the chromium may be incorporated in the silica-alumina at an earlier stage of preparation. The silica and alumina raw materials may be separately precipitated from aqueous solutions of their compounds in conventional manner or commercially available silica gel and hydrated alumina may be utilized.

It has been found that some silica-alumina bases made by grinding the separately prepared materials are improved by steam treatment utilizing a mixture of steam and air, such as air containing a minor amount of steam. Treatment of the base with a mixture of 95 percent air and 5 percent steam at a temperature of 1200° F. has been found effective in improving the function of the silica-alumina base in the composite catalyst. Steam treatment at temperatures in the range of 1100 to 1300° F. and at various steam concentrations is effective in improving the characteristics of the silica-alumina base where the starting materials are amenable to improvement by steam treatment.

Suitable chromium compounds for impregnating the silica-alumina base include chromium nitrate, chromium chloride, and chromic acid (aqueous solution of $CrO_3$). Impregnation with chromic acid or with chromium nitrate is preferred in view of the fact that these solutions are easier to work with and generally produce more active catalysts than other types of solutions. The amount and concentration of the chromium solution is controlled so as to incorporate an amount of chromium in the catalyst composite in the range of 0.1 to 10 or more weight percent. Concentrations higher than 10 percent are operable but do not warrant the increased cost of the catalyst. It is essential that a substantial portion of the chromium in the catalyst be in the hexavalent state. Hexavalent chromium in the catalyst should be at least 0.1 weight percent of the composite and larger proportions are more desirable. It is preferred that not more than 25 weight percent of the chromium in the catalyst is trivalent.

The silica-alumina base prepared in the manner described may contain various proportions of these two constituents but it is preferred to use a base in which the silica is in major proportion. A very effective base consists of 90% silica and 10% alumina (by weight). The base should contain at least 2 to 3 weight percent of alumina.

In order to illustrate the invention the following specific example is presented. It is to be understood that the specific conditions utilized are merely illustrative of desired and preferred conditions and are not to be interpreted as unnecessarily limiting the invention.

*Example*

Three catalyst bases were impregnated with chromic acid so that the finished catalyst composite contained 2.5 weight percent chromium. After preparation as hereinafter described, the pellets or pills containing the impregnating chromium compound were dried and ground to about 20–70 mesh and activated by calcination in air at 950° F.

Base A was prepared as follows:
1370 grams of commercial silica hydrogel and 61 grams commercial hydrated alumina were mixed and ground dry to reduce the particle size below 20 mesh, mixed with 800 ml. of distilled water, milled in a ball mill for 16 hours, dried at 210–240 F. for 24 hours, mixed with 1200 ml. of distilled water and again milled for 24 hours. The milled material of an average particle size of less than 25 microns was dried to the proper water content for extrusion, extruded into cylinders 3/16 inch in diameter and length, dried under controlled conditions to produce strong particles, calcined at 1000 F. for 14 hours, and steam treated at 1200 F. for 12 hours in air containing 5 percent steam. This catalyst base contained 90 percent silica and 10 percent alumina.

Base B was a commercial coprecipitated gel base containing 88 percent silica and 12% alumina (by weight) but the actual preparation procedure utilized in making this base is not definitely known. However, the procedure involved is believed to be approximately the same as that utilized in preparing Base C which is set forth in the ensuing paragraph.

Base C was prepared as follows:

A solution containing 131 grams of sodium aluminate and 6,000 ml. of distilled water was mixed with a solution containing 2350 grams of sodium silicate and 9,000 ml. of distilled water. A hydrogel was precipitated by adding to this mixture a solution containing 44 grams of ammonium chloride and 5,000 ml. of distilled water. This addition was instantaneous and was accompanied by vigorous stirring which was stopped 30 seconds after the addition. The gel was placed on five 24 cm. Buchner funnels and allowed to drain for three hours. Then the gel was placed in 11 muslin bags 10 x 36 inches and these bags were placed in 18 liters of a 5 percent ammonium chloride solution which had been heated to 170° F. The bags were squeezed several times and after five minutes they were removed from the hot solution and drained for five minutes. After draining, the bags were returned to the hot ammonium chloride solution for a repetition of the above treatment. This was repeated for a total of 12 times. After the ammonium chloride treatment, the gel was dried at room temperature under a fan for five days and then in an oven at 210–240° F. for two days (fresh air was heated and blown over the gel). The dry gel was washed by stirring it in 5 liters of distilled water for ten minutes and filtering. The washing was repeated for a total of five times. The gel was next washed ten times by this same procedure except that a 5 percent ammonium chloride solution was used instead of distilled water. This gel was again washed in distilled water five times in the same manner as above. The washed gel was dried at 210-240° F. for five days, mulled with a weight of water equivalent to the weight of the dry gel, molded into 3/16 in. cylinders, dried under controlled conditions to produce strong particles, calcined at 1000° F. for one hour, and steam treated at 1200° F. for 12 hours in air containing 5 percent steam.

The three catalysts made by depositing 2.5 percent chromium on the above-described basis were tested for the polymerization of ethylene in a stirred reactor in which the catalyst particles were suspended in cyclohexane containing dissolved ethylene. Technical grade ethylene (95–97% ethylene, balance mostly ethane) was pumped into the reactor so as to maintain the pressure at 450 p.s.i.g. as reaction proceeded. The temperature was maintained at approximately 270° F. and the runs were for a duration of 4 hours with constant stirring of the reactant mixture. The following results were obtained.

Catalyst: Reaction rate[1]

Base A (Mixed and ground)_____ 35
    Base B (Commercial coprecipitated)_____ 28
    Base C (Laboratory coprecipitated)_____ 25

[1] Pounds of solid polymer per pound of catalyst per hour.

These data show that the base prepared by mixing separately prepared gels is superior to the bases prepared from coprecipitated gels in polymer production. The base prepared by mixing silica gel and hydrated alumina has another advantage in that both materials are commercially available and this facilitates the duplication of the appreciably more active catalysts than obtained by impregnating coprecipitated silica-alumina gel with the chromium compound.

Certain modifications of the invention will become apparent to those skilled in the art and the illustrative details disclosed are not to be construed as imposing unnecessary limitations on the invention.

I claim:

1. A method of making an improved chromium oxide-silica-alumina catalyst which comprises mixing separately prepared silica gel and hydrated alumina, grinding the mixture admixed with free water to an average particle size below about 25 microns, incorporating a minor but effective amount of chromium oxide in the comminuted material, and activating the composite catalyst by heating the same at an elevated temperature in a non-reducing atmosphere so as to form a substantial proportion of hexavalent chromium in the composite.

2. The method of claim 1 including the step of heating the comminuted silica-alumina at a temperature in the range of 750 to 1500° F. prior to incorporation of the chromium oxide therein.

3. The method of claim 1 wherein the silica-alumina is impregnated with chromium oxide by soaking same with chromic acid, followed by drying the composite; and said activation comprises heating the composite at a temperature in the range of 750 to 1500° F. for a time in the range of 3 to 10 hours in a dry, free-oxygen-containing atmosphere.

4. The method of claim 3 wherein the comminuted silica-alumina is formed into pills before impregnation.

5. A method of making a chromium oxide-silica- alumina catalyst of enhanced solid polymer producing activity in the polymerization of olefins comprising admixing separately precipitated silica and hydrated alumina with the silica in major proportion and containing at least 2 weight percent alumina based on total alumina plus silica; comminuting the resulting mixture in admixture with free water to an average particle size less than 25 microns to form a homogeneous mixture; pelleting the comminuted mixture; calcining the resulting pellets at an elevated temperature to harden same; soaking the calcined pellets in an aqueous solution of a chromium compound converted to an oxide thereof containing hexavalent chromium by heating same in a non-reducing atmosphere so as to incorporate at least 0.5 weight percent of chromium in the finished catalyst; drying the impregnated silica-alumina; and heating the dried composite in a non-reducing atmosphere at a temperature in the range of 750 to 1500° F. so as to activate the same.

6. The process of claim 5 utilizing chromic acid as the impregnant.

7. The process of claim 5 utilizing chromium nitrate as the impregnant.

References Cited in the file of this patent

UNITED STATES PATENTS

| | | |
|---|---|---|
| 2,340,934 | Connolly | Feb. 8, 1944 |
| 2,728,752 | Brown | Dec. 27, 1955 |
| 2,735,801 | Gutzeit | Feb. 21, 1956 |
| 2,746,936 | Plank | May 22, 1956 |
| 2,773,845 | Stover et al. | Dec. 11, 1956 |
| 2,780,617 | Zletz | Feb. 5, 1957 |
| 2,787,600 | Hunter | Apr. 2, 1957 |
| 2,825,721 | Hogan | Mar. 4, 1958 |